Figure 4:
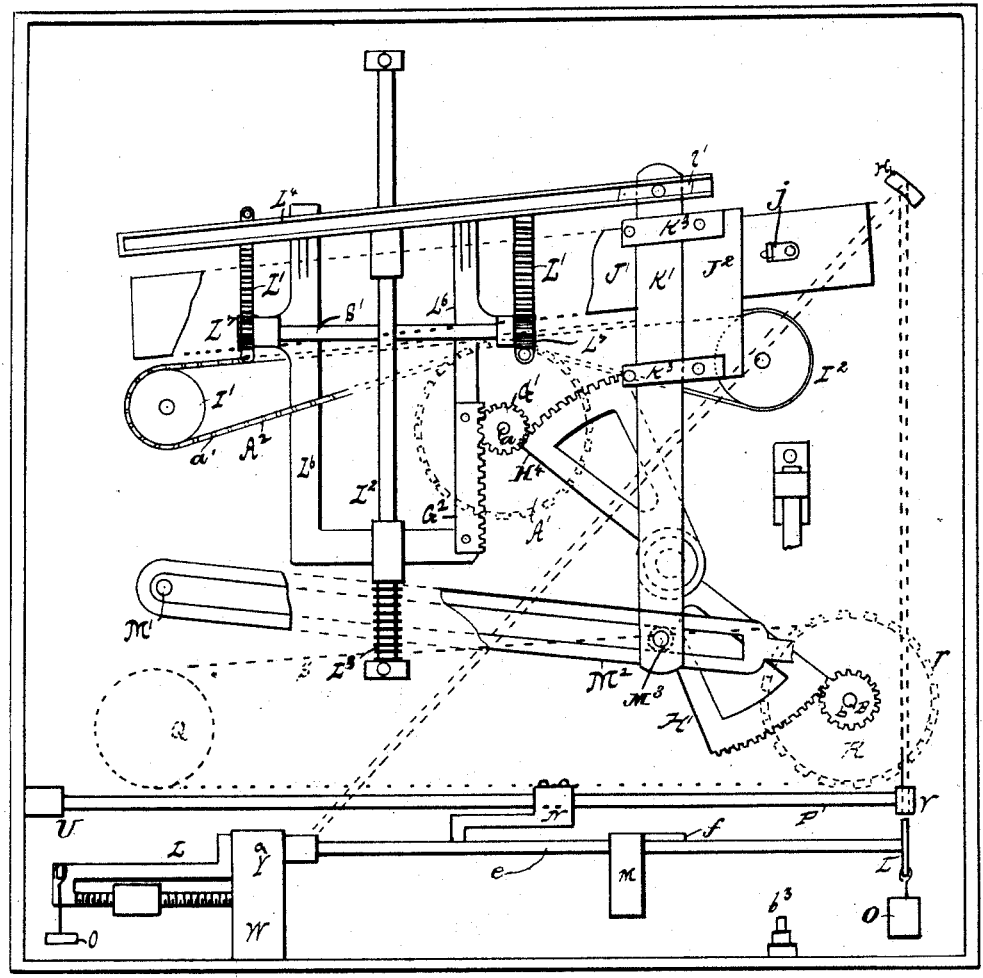

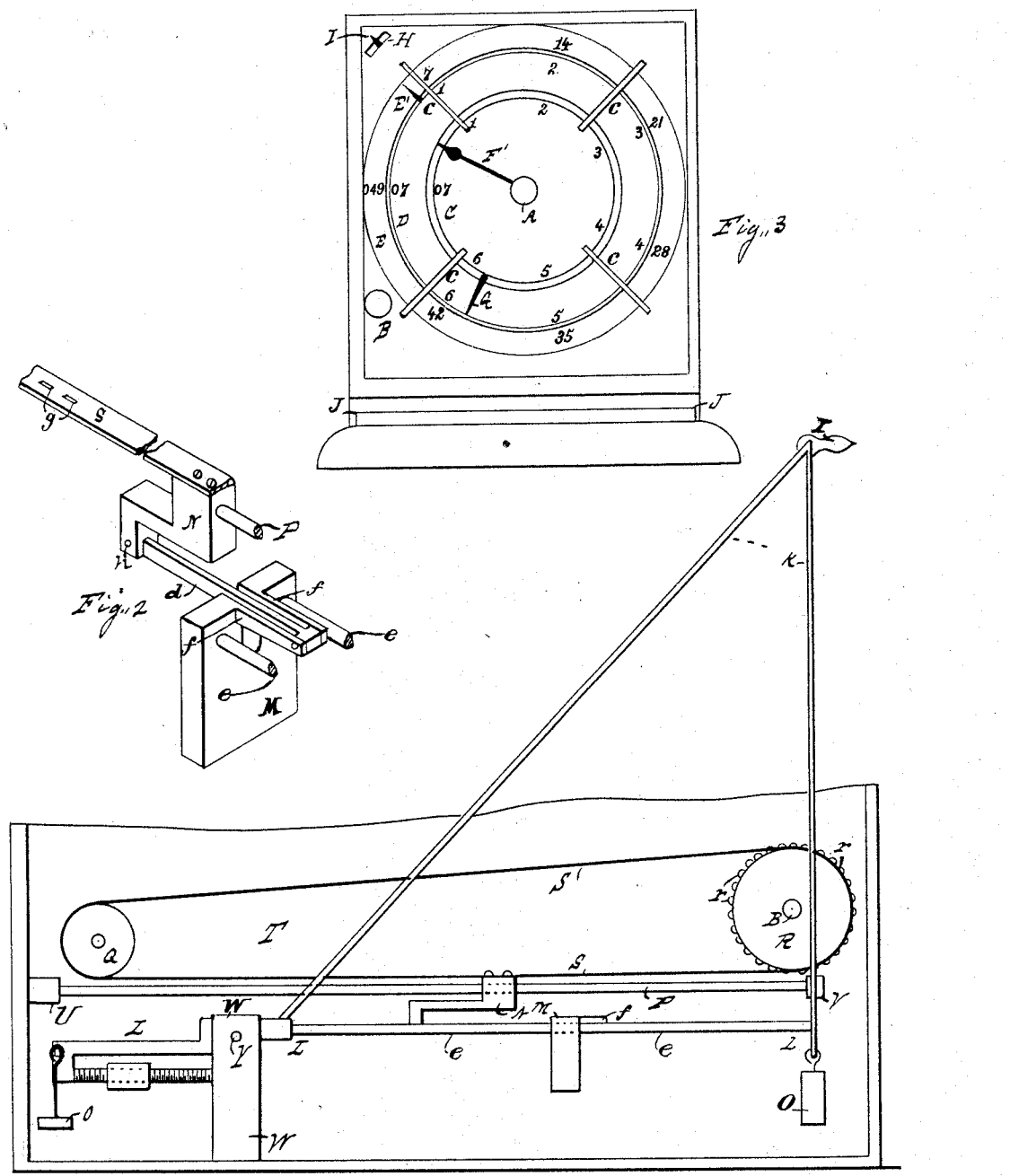

(No Model.)  3 Sheets—Sheet 2.

H. C. HART.
WEIGHING AND PRICE SCALES.

No. 428,560. Patented May 20, 1890.

Witnesses Gertrude Anderson. Henry C. Hart
Geo H Lothrop  Inventor (No Model.)  3 Sheets—Sheet 3.
H. C. HART.
WEIGHING AND PRICE SCALES.
No. 428,560.  Patented May 20, 1890.
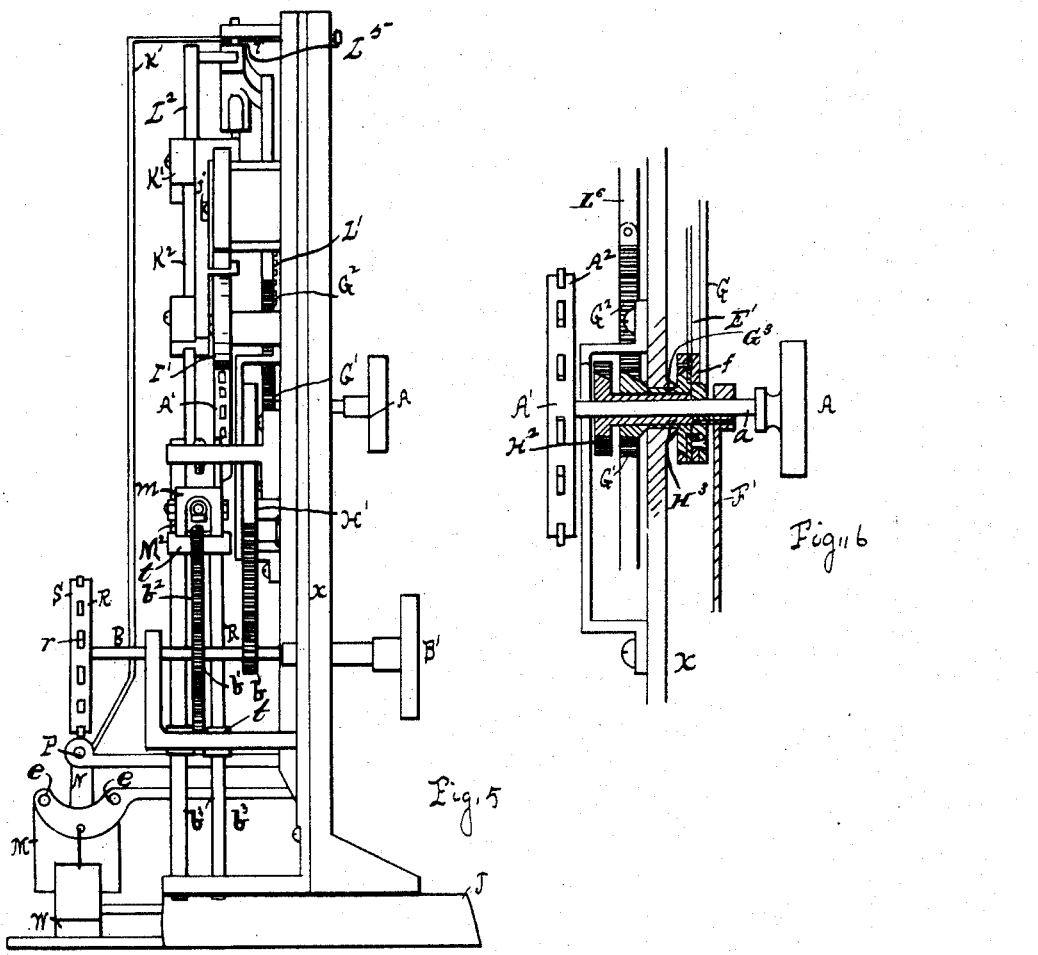
Witnesses  
Gertrude Anderson  
Geo. H. Lothrop  
Inventor  
Henry C. Hart

UNITED STATES PATENT OFFICE.

HENRY C. HART, OF DETROIT, MICHIGAN.

WEIGHING AND PRICE SCALES.

SPECIFICATION forming part of Letters Patent No. 428,560, dated May 20, 1890.

Application filed July 22, 1889. Serial No. 318,265. (No model.)

*To all whom it may concern:*

Be it known that I, HENRY C. HART, of Detroit, in the county of Wayne and State of Michigan, have invented a new and useful Improvement in Price and Weighing Scales, of which the following is a specification.

My invention consists in an improvement in price and weighing scales, hereinafter fully described and claimed.

Figure 1 is an elevation showing the connection of the scale-beam with the price mechanism. Fig. 2 is a perspective detail showing the connection between the poise and the weight-indicator. Fig. 3 is a front elevation of the scale. Fig. 4 is an elevation of the calculating mechanism, with the weighing-scale attachment shown in dotted lines. Fig. 5 is an end elevation, and Fig. 6 is a vertical section, of part of the mechanism.

The mechanism by which the weight, price, and cost are indicated is the same as that shown and described in my application for patent for calculating-machine, filed February 7, 1889, Serial No. 298,996, and Fig. 4 of the drawings of this application is the same as Fig. 2 of my former application plus the attachment to the scale.

C, D, and E represent three concentric dials, each graduated with a series of numbers, the highest number on one of the dials (preferably dial E) being the multiple of the two highest numbers on the other two dials. Each dial is provided with a pointer F', G, and E', which are operated by the mechanism shown and described in my former application, as follows:

$a$ represents a shaft, on which is rigidly secured a pointer F', and which carries at its inner end a sprocket-wheel A'.

$H^3$ represents a hollow shaft sleeved on the shaft $a$, carrying on one end a gear-wheel $H^2$ and on the outer end the pointer G, and $G^3$ represents a shorter hollow shaft sleeved on the hollow shaft $H^3$ and carrying on one end a pointer E'.

J' represents a guide-rod secured on the back of the frame of the machine, and preferably parallel with a lever $M^2$ when at its highest or initial position, on which slides a carriage $J^2$, Fig. 4, the range of motion of said carriage being limited by a stop $j$.

$A^2$ represents an endless metal belt running over the pulleys I' $I^2$, journaled on shafts in the back of the frame and provided with perforations $a'$, which engage with the sprocket-wheel A'. The belt $A^2$ passes through and is connected with the carriage $J^2$, whereby the motion of the sprocket-wheel A' in either direction moves the carriage $J^2$ along the guide-rod J'.

$L^2$ represents a guide-rod secured vertically on the back of the frame, passing up between the guide-rod J' and frame, encircled at its lower end with a light coiled spring $L^3$, the object of which is to serve as a counterpoise for a light rectangular frame $L^6$, which slides vertically on said guide-rod $L^2$. The upper side of the frame $L^6$ consists of a channel-bar $L^4$, which projects at both sides of the frame and is set parallel with the guide-rod J', and in this channel-bar runs a block $l'$. To prevent the frame $L^6$ from tilting and binding and to hold it at all times in its proper plane, a shaft S' is journaled in said frame $L^6$ and carries at its ends two pinions $L^7$, which mesh into racks L', secured to the frame, whereby both sides of said frame $L^6$ are forced to move equally, no matter at what point of the channel-bar forming the top of the frame the power is applied.

$M^2$ represents a lever, one end of which is pivoted at M', Fig. 4, to the frame of the machine.

K' represents a connecting-rod, which is movably fastened by keepers $K^3$ to the carriage $J^2$, and the lower end of this rod is connected with the lever $M^2$ by a roller $M^3$, lying in the slot in the lever $M^2$, and the upper end of this rod K' is connected with the sliding block $l'$ in the channel-bar $L^4$, forming the top of the frame $L^6$, and the rod K' is shifted along the channel-bar $L^4$ and the lever $M^2$ by the carriage $J^2$.

The distance from the fulcrum to the point where rod K' connects with lever $M^2$ (whatever that may be) constitutes the short arm of lever $M^2$, and this short arm may be varied from nothing to the whole length of the slot in lever $M^2$, which equals the total travel of the carriage $J^2$. The distance from the fulcrum M' to the point where the actuating mechanism is connected with the lever constitutes the long arm of the lever. Thus the effect of shifting rod K' along lever $M^2$ is to vary the relative lengths of the two arms of the lever.

$b^3$ $b^3$, Fig. 5, represent two guide-rods rising vertically from the foot of the frame $x$, between which plays the free end of lever M². $t\, t$, Fig. 5, represent two cross-heads running on said guide-rods $b^3$, connected by a rack $b^2$. The upper cross-head $t$ is provided with an upward extension $m$, which is secured to the free end of lever M² in such wise that the motion of the cross-head $t$ oscillates said lever, but permits the slight endwise motion required by the fact that the lever swings through the arc of a circle, while the cross-head moves in a straight line.

B represents a shaft journaled in the frame $x$, having on one end a thumb-wheel B'. On this shaft B are two pinions $b\, b'$, one of which $b$ has the same number of teeth as the pinion H².

H' and H⁴ designate a double segment pivoted to the frame $x$, one end meshing with the pinion $b$ and the other end with the pinion H², so that motion communicated through the shaft B to the pinion $b$ will be exactly transmitted to the pinion H² and pointer G. In Fig. 4 the pinion H² is concealed by the pinion G'.

G² represents a rack secured on the side of the frame L⁶ and meshing with the pinion G', so that the vertical motion of the frame L⁶ moves the pinion G' and the pointer E'.

When all the pointers are at zero, the positions of the carriage J², rod K', and frame L⁶ are such that the fulcrum M' of the lever M² is the point where the connecting-rod K' is connected with said lever. The lever M² should be then at the top of its stroke. In this position, therefore, motion of said lever will not in any way affect the connecting-rod K', and therefore the lever M² is free to move without in any way moving the frame L⁶, so that if in this position the shaft B be rotated the lever M² will move and the pointer G will be rotated, but the rest of the mechanism and the other pointers will remain stationary. But suppose the shaft $a$ be rotated through one-half a rotation, thus causing the pointer F' to traverse one-half of the dial C. This will also rotate the sprocket-wheel A' through half a rotation and move the carriage J² one-half its total travel on guide-rod J'. The point of connection between the rod K' and lever M² will therefore be shifted to a position equal to one-half of the total travel of said rod in the slot of the lever M², and of course the block $l'$ will also move an equal distance in the channel-bar L⁴. If this causes the pointer F' to stand at the figure "25," it puts the mechanism in such position that any motion given to the pointer G will cause the pointer E' to indicate or register twenty-five times the figure indicated by the pointer G in this manner: Motion of the shaft B causes the pinion $b$, acting through the segment H', to operate the pinion H², and thus move the pointer G. At the same time the other pinion $b'$ on the shaft B causes its connections to draw down the free end of the lever M², thus drawing down the connecting-rod K' (which slides in the keepers K³, by which said rod is attached to the carriage J²) and drawing down the frame L⁶ through the connection $l'$ between the rod K' and said frame L⁶. This causes the rack G² on said frame to rotate the pinion G', and thus move the pointer E'.

L represents a scale-beam fulcrumed on the knife-edge Y in the post W, and having its short arm connected with the platform of the scales in the ordinary manner, and also provided with the ordinary counter-weights O for balancing the scales. (Indicated in Fig. 1.) The main beam L may of course be a single beam, which, unlike ordinary scale-beams, is not graduated; but I prefer the construction shown in the drawings, in which the main part of the beam L is made of two single round rods of iron $e$, as shown in Figs. 1 and 2.

M represents the scale-poise which slides on the scale-beam L, which beam, when made, as shown in the drawings, of two bars, passes through holes in the counterpoise.

P represents a guide-rod fastened to supports U and V above the scale-beam, upon which slides a block N. The block N projects downwardly from the guide P to a point between the two parts $e\, e$ of the scale-beam L, and this lower projection is connected with the poise M by a rod or link $d$, which is pivoted at one end to projections $f\, f$ on the poise and at the other end to the block N by the pin $n$.

R represents a sprocket-wheel secured on the shaft B, which is extended for the purpose, and having sprockets $r$ on its periphery.

S represents an endless belt engaging by its perforations $g$ the sprockets $r\, r$ of a sprocket-wheel R and running over a wheel Q, mounted on a shaft journaled on a stud in the frame of the machine, and this endless belt S is connected with the block N, so that when said belt is moved it moves the block N, and the range of motion of the block N, and therefore of the poise M, is equal to the circumference of the sprocket-wheel R, so that a single rotation of said sprocket-wheel carries the poise M from one end of the scale-beam to the other.

H represents a slot in the face of the frame, through which projects a pointer I, carried on a frame K, secured to the scale-beam L. The only object of this frame and pointer is to indicate on the outside of the machine when the beam comes to a balance, and it is immaterial where said pointer I be located or how it be connected with the scale-beam.

The operation of my invention is as follows: The article to be weighed is placed upon the platform J of the scales, or, if a pan be used instead, upon the pan, and the shaft $a$ is rotated by means of its hand-wheel A until the pointer F' indicates on the dial C the price per pound of the article to be weighed. This adjusts the calculating mechanism, so that when the pointer G is moved the pointer E' will indicate the multiple of the numbers indicated by the pointers F' and G, as explained in my former application. When the shaft B is rotated, which actuates pointers G and E', it also, through the sprocket-wheel R and chain S, moves the sliding block N on the guide-rod P and shifts the poise M along the beam L until the scale balances, which is shown by the pointer I, registering with a suitable index on the main frame of the machine. When the scale balances, the pointer G (if the dials are arranged as supposed) will indicate the weight of the article on the scales, and the pointer E' will indicate the multiple of the weight and the number indicated by pointer F', or the value of the article weighed at the assumed price per pound.

What I claim as my invention, and desire to secure by Letters Patent, is—

1. In a weighing and price scale, the combination of a vibrating lever $M^2$, a carriage $J^2$, connected with said lever, a shaft provided with a hand-wheel A and sprocket-wheel A', a belt $A^2$, engaged with said sprocket-wheel and carriage, a series of concentric dials, one of which is provided with a pointer mounted directly on the sprocket-wheel shaft, and a scale-beam L, having its poise M connected with the lever-actuating mechanism, substantially as described.

2. In a weighing and price scale, the combination, with the scale-beam, the poise, and the pivoted lever, of gearing connected both with the lever and the poise for actuating said lever, and registering mechanism for indicating the extent of motion of both said lever and poise, substantially as shown and described.

3. In a weighing and price scale, the combination, with a scale-beam L and its poise M, of the vibratory lever $M^2$, a series of concentric dials provided with pointers, and actuating mechanism connected with both the lever and the poise, substantially as described.

4. In a weighing and price scale, the combination of an endless belt, a movable block mounted on a guide parallel with the scale-beam when said beam is at rest at some point of its vibration, a scale-beam carrying a poise, and a pivoted rod connecting said movable block with the poise, substantially as shown and described.

5. In a weighing and price scale, the combination, with the scale-beam and the poise on the scale-beam, of a graduated dial, a pointer movable on said dial, and a shaft connected with both said poise and pointer, whereby the motion given to the poise is indicated on said dial by said pointer, substantially as and for the purposes set forth.

6. In a weighing and price scale, the combination, with a scale-beam, a poise movable thereupon, a guide located in juxtaposition to the scale-beam, a block movable on the guide, and a pivotal connection between the block and the poise, of an endless traveling belt connected with the block, rotary wheels journaled on the scale-frame and around which the belt passes, a pointer-carrying shaft, and means for rotating one of the wheels at will by turning the pointer-carrying shaft, substantially as described.

7. In a weighing and price scale, the combination of a scale-beam, a poise sliding on the scale-beam, an endless belt connected with the poise, a rotary wheel for moving the belt, a stationary dial, and a shaft rotating with the wheel and carrying a pointer which moves around the dial to indicate the motion of the poise, substantially as described.

8. In a weighing and price scale, the combination of a scale-beam, a poise sliding on the scale-beam, a wheel having a rotating shaft carrying a pointer, a dial around which the pointer travels, connections between the wheel and poise, a rotating pointer-carrying shaft A', and gearing connecting the latter with the wheel, substantially as described.

9. In a weighing and price scale, the combination of a scale-beam having a movable poise, three graduated dials provided with movable pointers, a vibratory lever adjustably connected with the pointer of one of said dials, gearing for moving one of said pointers and proportionately varying the connection between said lever and the pointer with which it is adjustably connected, and gearing for simultaneously moving the lever, the poise, and two of the pointers, substantially as described.

10. In a weighing and price scale, the combination of a scale-beam carrying a poise, a guide-rod parallel with the scale-beam, a movable block mounted on said guide-rod and connected with the poise, calculating and registering mechanism comprising concentric dials provided with pointers, and gearing for simultaneously actuating the poise and pointer, substantially as described.

11. In a weighing and price scale, the combination of the scale-beam L, having a movable poise M, the guide-rod P, the block N, mounted on said guide-rod and connected with the poise, the shaft B, having sprocket-wheel R, the endless belt S, the shaft $a$, having sprocket-wheel A', the vibratory lever $M^2$, the carriage $J^2$, connected with said lever, the endless belt $A^2$, connecting said carriage with the sprocket-wheel A', the vertically-movable frame $L^6$, a series of three concentric dials, one of which is provided with a pointer geared with said frame, another with a pointer mounted directly on the shaft of the sprocket-wheel A', and another geared with the shaft of the sprocket-wheel R, substantially as described.

HENRY C. HART.

Witnesses:
GERTRUDE ANDERSON,
GEO. H. LOTHROP.